United States Patent [19]
Thoelke

[11] Patent Number: 5,813,160
[45] Date of Patent: Sep. 29, 1998

[54] PORTABLE HUNTING BLIND

[76] Inventor: Cary W. Thoelke, 2617 N.E. 12th Ave., Pompano Beach, Fla. 33064

[21] Appl. No.: 739,628

[22] Filed: Oct. 29, 1996

[51] Int. Cl.$^6$ .................................................. A01M 31/02
[52] U.S. Cl. .................................. 43/1; 135/901; 135/87; 135/121; 135/160; 135/902; 24/716
[58] Field of Search .............................. 135/87, 121, 122, 135/157, 158, 160, 900, 901, 902, 909, 119; 43/1; 52/63; 4/599; 24/716; 16/87.4 R

[56] References Cited

U.S. PATENT DOCUMENTS

| | | | |
|---|---|---|---|
| 4,777,755 | 10/1988 | Colburn | 43/1 |
| 4,846,249 | 7/1989 | Cooper | 16/87.4 |
| 5,144,780 | 9/1992 | Gieling | 135/909 |
| 5,377,711 | 1/1995 | Mueller | 43/1 |
| 5,429,148 | 7/1995 | Hammer | 135/121 |
| 5,544,387 | 8/1996 | Yamamoto | 24/716 |

FOREIGN PATENT DOCUMENTS

| 1490807 | 8/1967 | France | 135/902 |
|---|---|---|---|

*Primary Examiner*—Jack W. Lavinder
*Attorney, Agent, or Firm*—Robert M. Downey, P.A.

[57] ABSTRACT

A portable hunting blind includes a collapsible frame structure having an upper frame assembly defined by generally U-shaped interconnecting sections and a lower frame assembly defined by generally U-shaped interconnecting sections, the frame assemblies being provided with a continuous track to accommodate movement of traveler assemblies thereal-ong. The traveler assemblies each include oppositely disposed wheels which ride within the continuous track and a hook member extending from the frame assembly for removable attachment to a respective top or bottom peripheral edge of a curtain. The curtain can be provided with a camouflage pattern to suit any environment and is pulled closed, about the continuous track of the upper and lower frame assemblies, to define front, back and side walls. The front, back and side walls include window openings with closure flaps to facilitate viewing and firing of a weapon therethrough from within the blind. A roof panel removably attaches to the upper peripheral edges of the curtain to cover the top of the blind.

6 Claims, 3 Drawing Sheets

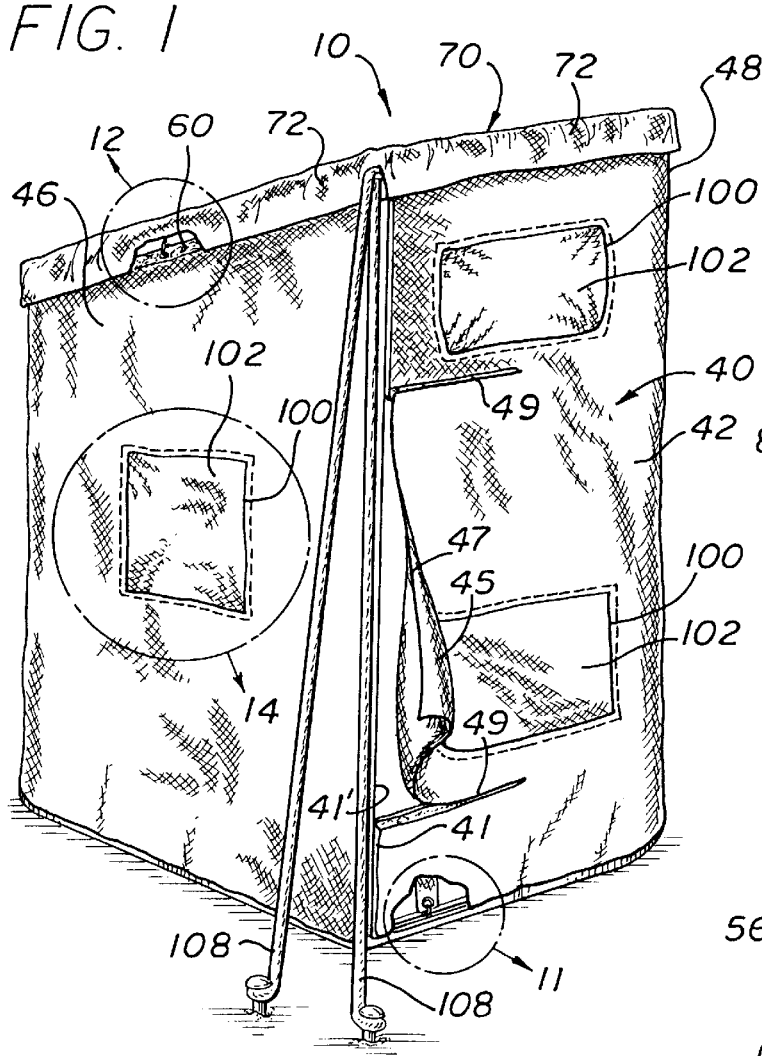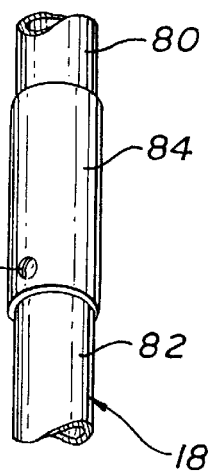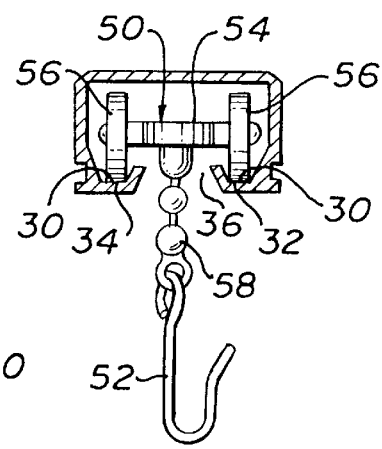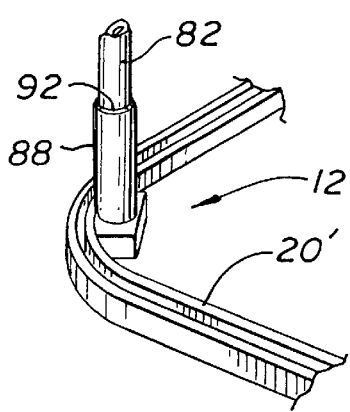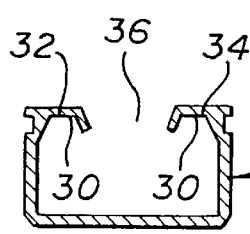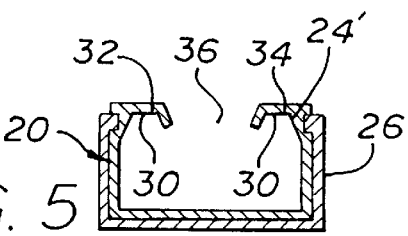

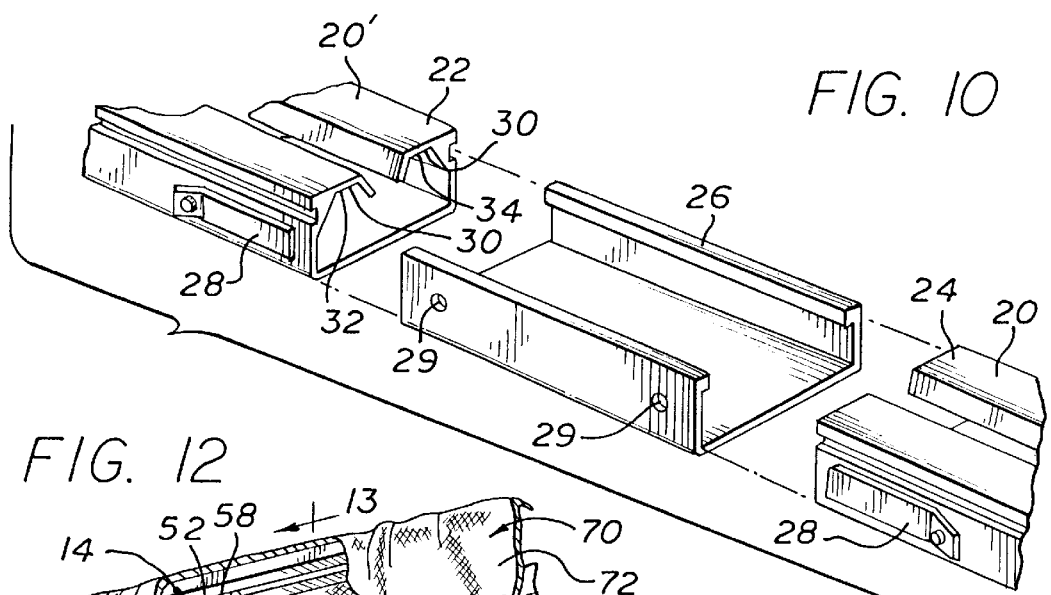
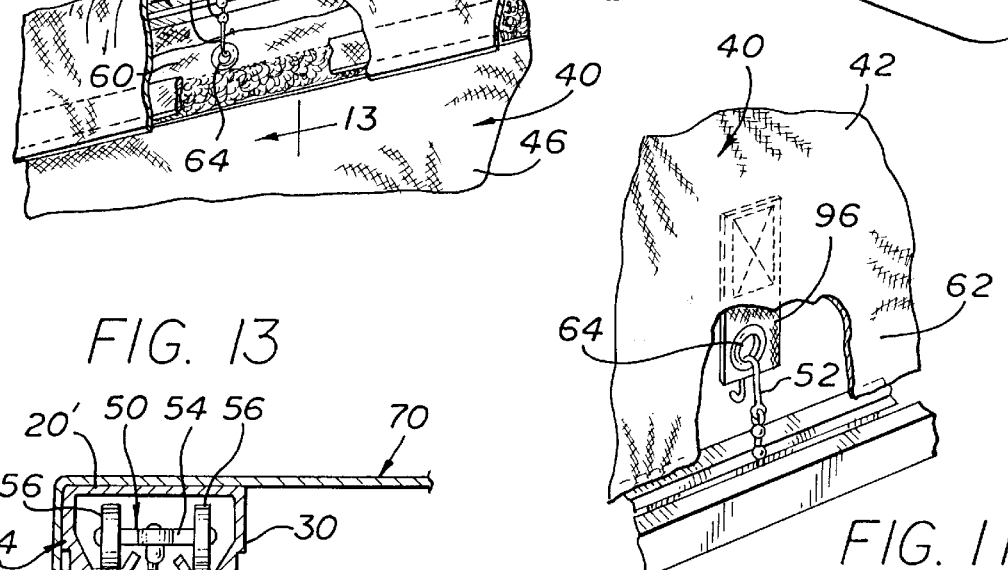
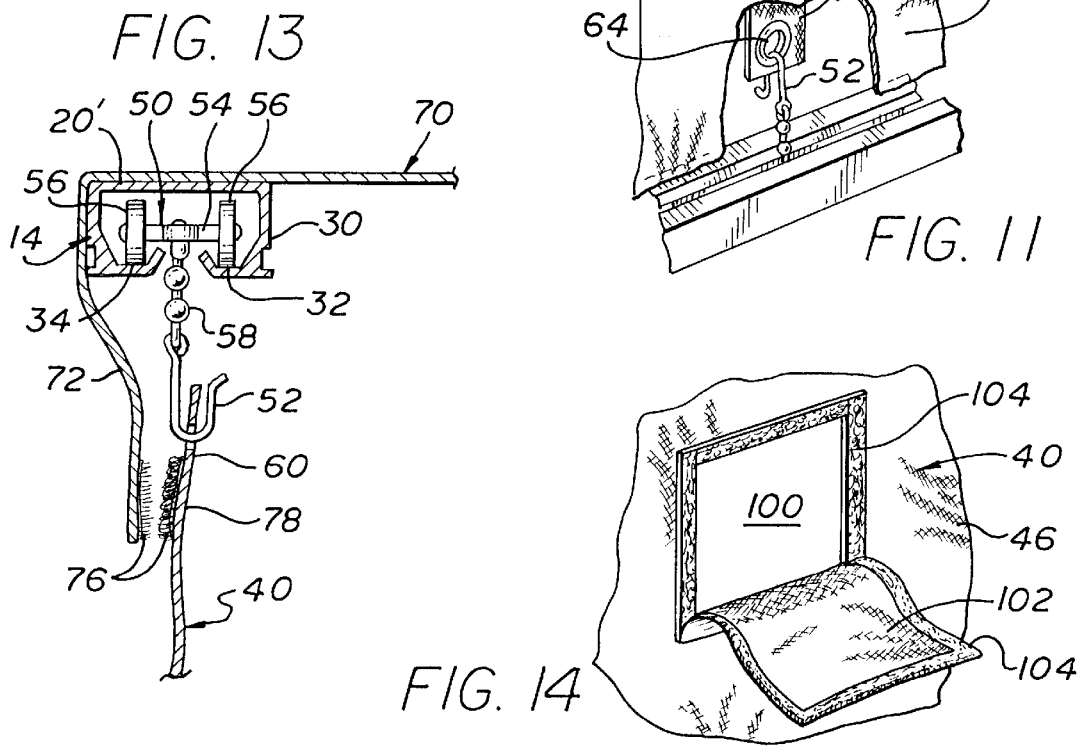

PORTABLE HUNTING BLIND

BACKGROUND OF THE INVENTION

1. Field of the Invention

The present invention relates to hunting blinds and, more specifically to a portable hunting blind which is of a lightweight, collapsible construction so that it can be readily and easily assembled and disassembled for transport between different locations.

2. Description of the Related Art

Hunting blinds are often used by hunters, photographers and nature watchers in order to get as close as possible to wild game in their natural habitat without being recognized by the nearby animals. Because most animals have a heightened sense of awareness and are accustomed to their environment, they are easily alerted and spooked by foreign or strange appearances, including humans. The use of hunting blinds has been found by hunters, photographers, and nature watchers alike to be a highly effective means to disguise or camouflage themselves so as to blend in with the surrounding habitat. Aside from the camouflaging effect, hunting blinds provide shelter from the elements (rain, wind, snow, etc.).

Presently, the various hunting blinds known in the art are constructed as either a permanent or a collapsible structure. In either case, the presently known hunting blinds are all generally cumbersome, heavy and difficult to transport. Even the hunting blinds which are of a collapsible construction require a significant amount of time and effort to set up and disassemble. For this reason, hunters, photographers, and nature watchers have found it difficult, if not impossible, to transport a blind from their vehicle to one or more locations for temporary use.

Accordingly, there still exists a need in the related art for a portable, collapsible hunting blind which is substantially light in weight and can be easily transported between various locations for quick and easy assembly and disassembly. Further, there exists a need for a portable, collapsible hunting blind assembly which is adapted for use in a multiple of varying natural environments by providing for easy interchanging of the walls and roof to provide different camouflage appearances which are compatible for particular environments.

With the foregoing in mind, it is a primary object of the present invention to provide a portable, collapsible hunting blind which is substantially light in weight and can be easily assembled and disassembled for transport between different locations.

It is a further object of the present invention to provide a portable, collapsible hunting blind which provides for an easy change of camouflage to accommodate for use throughout seasonal changes and in different environments having varying terrain.

It is still a further object of the present invention to provide a portable, collapsible hunting blind which can easily be carried, assembled and disassembled by a single user.

It is yet a further object of the present invention to provide a portable, collapsible hunting blind which provides a pitched roof structure to permit runoff of rainwater, snow and debris.

It is still a further object of the present invention to provide a portable, collapsible hunting blind which includes at least one side wall curtain which is quickly and easily pulled around an upper and lower track structure to form a front wall, a rear wall, and opposite side walls.

It is still a further object of the present invention to provide a portable, collapsible hunting blind which includes a closeable curtain assembly, defining surrounding walls, wherein at least some of the walls are provided with closeable window openings to define gun holes and/or observation windows.

It is yet a further object of the present invention to provide a portable, collapsible hunting blind which includes a removable roof, enabling the hunting blind to be used for hunting duck and other flying game.

It is yet another object of the present invention to provide a portable, collapsible hunting blind which includes a side wall curtain structure which is easily moved along an upper and lower track structure to permit quick assembly and disassembly, and further permitting the walls of the blind to be left partially opened for bow hunting.

It is still a further object of the present invention to provide a portable, collapsible hunting blind which is substantially lightweight yet sturdy in construction for use in all types of environments.

SUMMARY OF THE INVENTION

The present invention is directed to a portable, collapsible hunting blind which satisfies the objects and advantages as set forth above. The hunting blind of the present invention includes a collapsible frame structure having an upper frame assembly defined by generally U-shaped interconnecting sections and a lower frame assembly defined by generally U-shaped interconnecting sections, the frame assemblies being provided with a continuous track to accommodate movement of traveler assemblies therealong. The traveler assemblies each include oppositely disposed wheels which ride within the continuous track and a hook member extending from the frame assembly for removable attachment to a respective top or bottom peripheral edge of a curtain. The curtain can be provided with a camouflage pattern to suit any environment and is pulled closed, about the continuous track of the upper and lower frame assemblies, to define front, rear and side walls. The rear and side walls include window openings with closure flaps to facilitate viewing and firing of a weapon therethrough from within the blind. A roof panel removably attaches to the upper peripheral edges of the curtain to cover the top of the blind.

BRIEF DESCRIPTION OF THE DRAWINGS

For a fuller understanding of the nature of the present invention, reference should be had to the following detailed description taken in connection with the accompanying drawings, in which:

FIG. 1 is a front perspective view of the hunting blind assembly of the present invention;

FIG. 3 is an isolated perspective view taken from the area indicated as 3 in FIG. 2, showing interconnection of a vertical post to a lower frame section of the collapsible frame structure;

FIG. 4 is a sectional view taken along the plane indicated by the line 4—4 in FIG. 2;

FIG. 5 is a sectional view taken along the plane indicated by the line 5—5 of FIG. 2;

FIG. 7 is a sectional view taken along the plane of the line 7—7 of FIG. 2, illustrating a traveler assembly fitted within the track structure of an upper frame section of the collapsible frame structure;

FIG. 8 is an isolated cutaway, shown in perspective, taken from the area indicated as 8 in FIG. 2, illustrating interconnection of upper and lower extensions of the vertical post structure;

FIG. 10 is an isolated exploded view, taken from the area indicated as 10 in FIG. 2, illustrating interconnection of opposing U-shaped frame sections of the lower frame assembly;

FIG. 11 is a perspective view, in partial cutaway, taken from the area indicated as 11 in FIG. 1, illustrating attachment of one of the traveler assemblies in the lower frame assembly to a lower peripheral edge of a curtain assembly of the invention;

FIG. 12 is an isolated perspective view, in partial cutaway, taken from the area indicated as 12 in FIG. 1, illustrating attachment of one of the traveler assemblies to a top peripheral portion of a curtain assembly of the present invention;

FIG. 13 is a sectional view taken along the plane indicated by the lines 13—13 of FIG. 12, illustrating attachment of the roof to an upper peripheral edge zone of the side wall curtain; and FIG. 14 is an isolated view, shown in perspective, taken from the area indicated as 14 in FIG. 1, illustrating a closeable flap structure to facilitate opening and closing of a window opening in one or more side walls of the curtain assembly.

Like reference numerals refer to like parts throughout the several views of the drawings.

DETAILED DESCRIPTION OF THE PREFERRED EMBODIMENT

Figure 6:
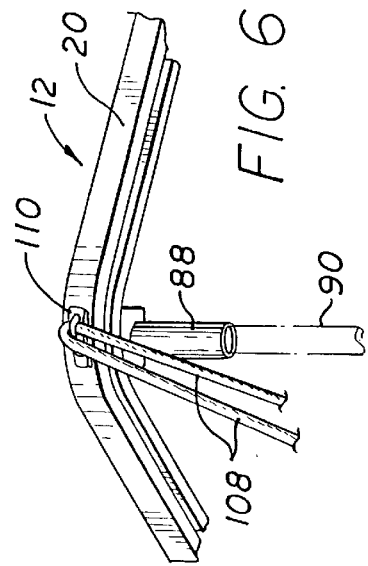
FIG. 6 is an isolated perspective view taken from the area indicated as 6 in FIG. 2, illustrating interconnection of a vertical post to an upper frame section of the frame structure.

Referring to the several views of the drawings, the hunting blind apparatus and components thereof is shown and generally indicated as 10.

Referring initially to FIGS. 2–10, the hunting blind apparatus 10 includes a collapsible frame structure 12 which is formed of a lightweight, yet strong material such as aluminum. The frame structure 12 includes an upper frame assembly 14, a lower frame assembly 16, and vertical support post assemblies 18 at four corners thereof for supporting the upper frame assembly in spaced relation above the lower frame assembly 16 at a predetermined, preferred angled orientation relative to the lower frame assembly 16. The angled orientation of the upper frame assembly 14 serves to provide a pitched roof which, when a roof panel is attached thereto (as shown in FIG. 1), will facilitate runoff of rain, snow and other debris.

Figure 9:
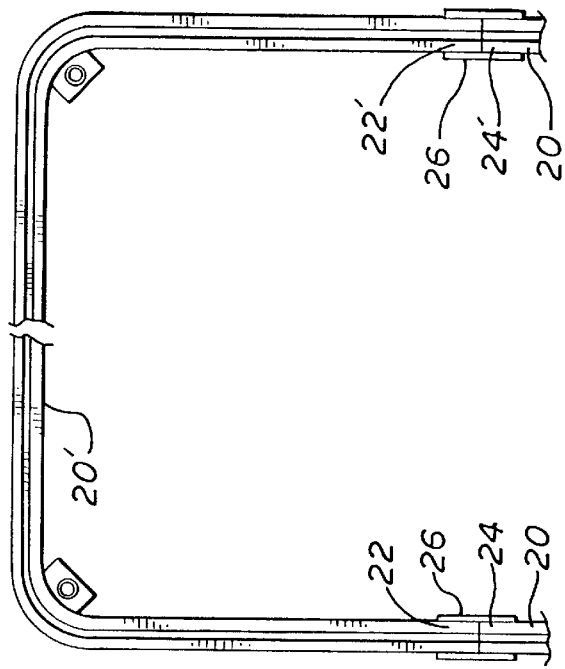
FIG. 9 is a top plan view, in partial cutaway, taken along the plane indicated by the line 9—9 in FIG. 2, illustrating the continuous track in a lower frame assembly.
Figure 2:
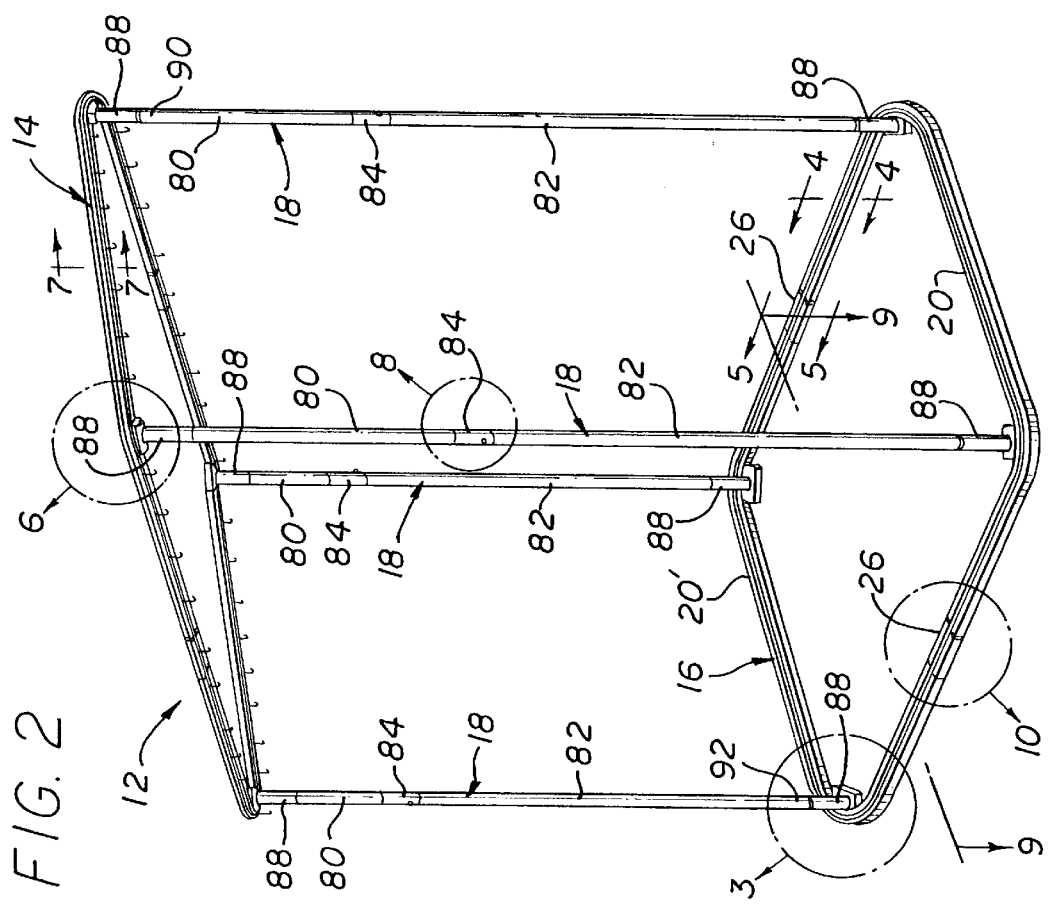
FIG. 2 is a front perspective view of a collapsible frame structure of the hunting blind assembly, shown assembled.

Both the upper and lower frame assemblies 14, 16 include opposing, generally U-shaped interconnecting sections 20, 20' which are best seen in FIGS. 2 and 9. The U-shaped sections include opposite free end zones 22, 22' which interconnect with opposing free end zones 24, 24' of the opposing U-shaped section. To facilitate interconnection, a channel segment 26 is used between the interconnecting opposing free end zones 22, 24 and 22', 24', as seen in FIG. 10. The channel segment 26 is specifically structured for sliding receipt of the free end zones of the U-shaped sections 20, 20' through opposite ends thereof until the distal ends of each of the free end zones 22, 24 and 22', 24' meet, thereby defining a continuous, closed loop for both the upper 14 and lower 16 frame assemblies. A spring biased button element 28 may be provided on each of the free end zones 22, 24, 22' and 24' of the U-shaped interconnecting sections 20, 20'. The spring biased buttons 28 are structured for releasable, interlocking engagement with apertures 29 formed in the side of the interconnecting channel segment 26.

The upper and lower frame assemblies 14 and 16 each include a continuous track 30 therealong. The track 30 in the upper and lower frame assemblies includes opposite rail members 32, 34 disposed in spaced relation to one another on opposite sides of an open slot 36 which extends about the entire length of the upper and lower frame assemblies 14, 16.

A curtain provides the wall structure of the hunting blind apparatus 10 including a front wall 42, a rear wall (not shown), and opposite side walls 46, 48 (not shown). In a preferred embodiment, the curtain 40 is provided with a camouflage pattern to suit a particular natural environment. The curtain 40 is secured closed at opposing vertical edges 41, 41' using hook and loop fasteners or other suitable releasable attachment means. An access door 45 is provided on the front wall 42 to permit entering and exiting of the interior of the blind 10. The access door 45 is defined by a flap cut into the front wall 42 and is secured closed along a vertical edge 47 and horizontal edges 49 using hook and loop fastening means. The curtain can be changed to provide different camouflage patterns as may be dictated by seasonal changes and different terrain.

A plurality of traveler assemblies 50 are movably fitted within the continuous track 30 of the upper and lower frame assemblies 14, 16. Each of the traveler assemblies includes a hook member 52, extending from a base 54, for removable attachment to the top and bottom edges 60, 62 of the curtain 40 at spaced intervals therealong. The traveler assemblies 50 are each further provided with roller elements 56 on opposite sides of the base 54 which are structured for travel along the opposite rails 32, 34 of the continuous track 30. A flexible linkage 58, such as a chain, interconnects the hook member 52 to the base 54 of the travel assembly 50 and extends through the open slot 36 of the track structure 30. In a preferred embodiment, grommets 64 are provided at spaced intervals along the top and bottom edges 60, 62 of the curtain for receipt of respective ones of the hook members 52 therein. In this manner, the curtain 40 can be pulled about the track structure 30 so as to complete the rear, front and side walls to enclose an interior of the hunting blind 10.

Referring to FIGS. 1, 12 and 13, a roof panel 70 is shown which drapes over the upper frame assembly 14 and includes peripheral edge zones 72 which secure by hook and loop fasteners 76, or like attachment means, to the upper peripheral zone 78 of the curtain 40. The roof panel 70 can be easily removed to provide an unobstructed open top to the hunting blind apparatus, as may be desirable when duck hunting or firing at other overhead targets.

The vertical post assemblies 18 preferably include at least two interconnecting segments, including an upper segment 80 and a lower segment 82. The upper and lower segments interconnect at a joint 84, as illustrated in FIG. 8, using a spring loaded button 86 similar to that shown in FIG. 10. The bend or corners of the upper and lower frame assemblies are provided with stub posts 88 which are structured for receipt within the opposite ends 90, 92 of the vertical post assemblies 18. In a preferred embodiment, the front post assemblies are longer than the rear post assemblies, as seen in FIG. 2, so that the upper frame assembly 14 is supported at an angled orientation relative to the lower frame assembly 16. This facilitates runoff of rainwater, snow and other debris, as previously described.

The upper and lower edges 60, 62 of the curtain include reinforcing means 96, such as webbing, to anchor the grommets 64 to the curtain 40, thereby preventing tearing therefrom.

In the preferred embodiment, the front, side and rear walls of the curtain 40 are provided with window openings 100 enabling a user within the interior of the blind to peer out in all directions. The window openings 100 further enable firing of a weapon therethrough at wild game. The windows 100 are provided with closure flaps 102 which open from the interior of the blind and are removably secured in covering relation to the window 100 with hook and loop fastening means 104 or like releasable attachment means about the peripheries of the flaps 102 and window openings 100, as shown in FIG. 14.

In high wind conditions, a tie down rope or cable 108 can be secured to eyelets 110 on opposite corners of the upper frame structure 12, as seen in FIGS. 1 and 6. The tie down ropes 108 are preferably anchored to the ground with stakes or other means.

While the instant invention has been shown and described in what is considered to be a preferred and practical embodiment thereof, it is recognized that departures may be made within the spirit and scope of the invention which, therefore, should not be limited except as set forth in the following claims and within the doctrine of equivalents.

Now that the invention has been described,
What is claimed is:

1. A hunting blind apparatus comprising:
   a collapsible frame structure including
      an upper frame assembly structured and disposed to define a closed loop,
      a lower frame assembly structured and disposed to define a closed loop,
      said upper and lower frame assemblies each including opposing, generally U-shaped sections, each of said U-shaped sections having a pair of opposite free end zones,
      interconnecting means for removably interconnecting said free end zones to opposing ones of said free end zones of said generally U-shaped frame sections to define said closed loop,
      vertical support means for supporting said upper frame assembly in spaced relation above said lower frame assembly and including a plurality of post assemblies having opposite distal ends structured and disposed for removable interconnection with a corresponding one of said upper and lower frame assemblies,
      said upper and lower frame assemblies including a continuous track therealong,
   a curtain defining side walls for surrounding an interior of said hunting blind apparatus includes a top edge, a bottom edge, and opposite vertically disposed edges,
   a roof panel having surrounding peripheral edge zones structured to drape over said upper frame assembly for removable attachment to said top edge of said curtain, thereby covering an opening through said closed loop of said upper frame assembly,
   said post assemblies including a first set of post assemblies and a second set of post assemblies, said first set having a greater length than said second set so as to support said upper frame assembly in an angled orientation relative to said lower frame assembly, thereby facilitating run off of rain water, snow and other debris which falls on said roof panel,
   a plurality of traveler assemblies removably attached to said top and bottom edges of said curtain at spaced intervals therealong, each of said traveler assemblies including roller elements structured and disposed for travel along said continuous track of said upper and lower frame assemblies so that said curtain can be moved and arranged to surround and enclose said interior of said hunting blind apparatus,
   reinforcing means on said top edge and said bottom edge of said curtain for reinforced attachment of said plurality of traveler assemblies thereto,
   said curtain being provided with at least one window opening having a closure flap which includes means for removably securing said closure flap in covering relation to said window opening, and
   means on said frame structure for securing said frame structure to a ground surface.

2. A hunting blind apparatus as recited in claim 1 wherein said curtain and said roof panel are provided with a camouflage pattern.

3. A hunting blind apparatus as recited in claim 1 wherein said continuous track formed in said upper and lower frame assemblies includes first and second rail members disposed in spaced relation to one another to define an open slot therebetween.

4. A hunting blind apparatus as recited in claim 3 wherein said roller elements on each of said traveler assemblies are structured and disposed for travel along said first and second rail members.

5. A hunting blind apparatus as recited in claim 4 wherein each of said traveler assemblies include a base for supporting said roller elements and a hook member extending from said base and through said open slot of said track structure for removable attachment to said curtain.

6. A hunting blind apparatus as recited in claim 5 wherein said top and bottom edges of said curtain include a plurality of grommets disposed in spaced relation to provide apertures for receipt of said hooks of said respective traveler assemblies.

* * * * *